March 21, 1961
A. G. SCHILBERG
2,976,079
MOTOR VEHICLE CONSTRUCTION HAVING INCREASED
RIGIDITY AT THE DASH AREA
Filed Feb. 18, 1957
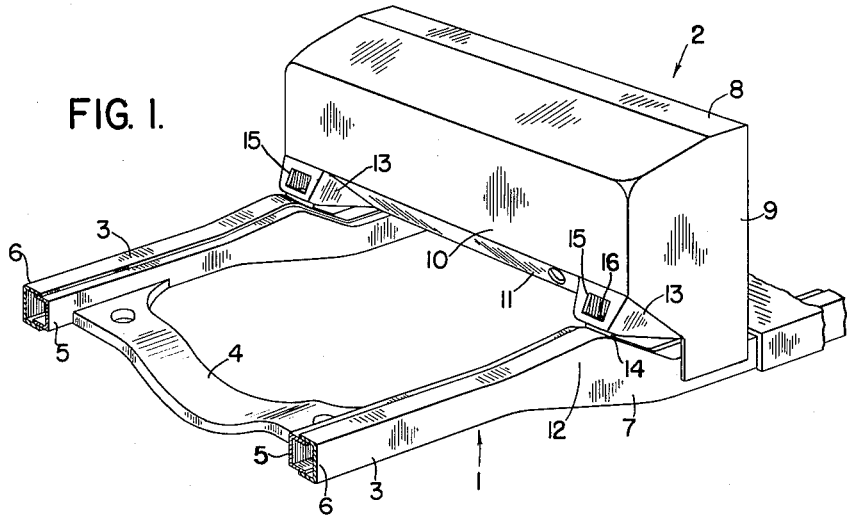
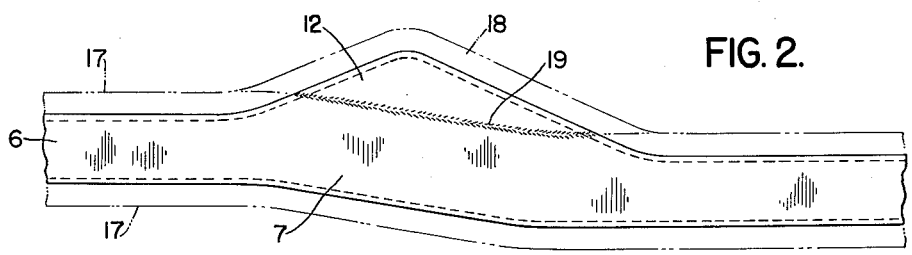
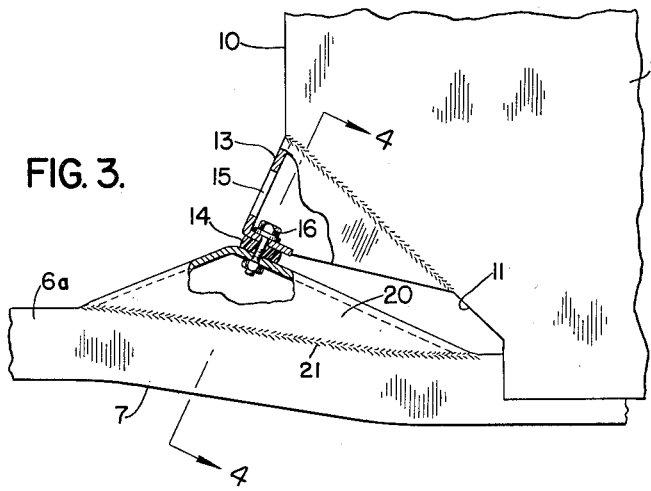
INVENTOR.
ARNOLD G. SCHILBERG
BY *Andrus & Scales*
Attorneys 2,976,079
Patented Mar. 21, 1961

2,976,079
MOTOR VEHICLE CONSTRUCTION HAVING INCREASED RIGIDITY AT THE DASH AREA

Arnold G. Schilberg, Milwaukee, Wis., assignor to A. O. Smith Corporation, Milwaukee, Wis., a corporation of New York Filed Feb. 18, 1957, Ser. No. 640,758

4 Claims. (Cl. 296—28)

This invention relates to a motor vehicle and more particularly to a vehicle frame having increased rigidity.

The conventional vehicle frame includes a pair of side rails which are provided with kicked-up portions to accommodate the front and rear wheel structures. At the front wheel kicked-up portions, the side rails are inclined or contoured gradually upwardly from the low point of the toe board to the front cross bar.

The present invention is directed to a vehicle frame structure which retains the curvature or contour of the lower surface of the conventional side rail in the area of the low point of the toe board to the front cross bar but raises the upper contour of the side rail in this area. According to the invention, the upper surface of the side rail follows generally the incline contour of the toe board from the low point of the toe board to the dash board and then extends downwardly from the dash board to the front cross bar which is located at the top of the kicked-up portion. This results in the vertical dimension of the rearward slope of the front kicked-up portion of the frame, from the low point of the toe board to the front cross bar, being approximately twice the vertical dimension of a conventional frame.

A pair of brackets are welded to the toe board and each of the brackets is connected to the respective humps or sections of increased vertical dimension of the side rails.

This construction results in a cantilever extending forwardly to the wheels with a depth or vertical dimension at the dash, or high reaction point, of twice that of a conventional frame. This provides greater stiffness at this location and substantially increases the resistance of the frame to overall bending and twisting stresses. In addition, the structure of the invention raises the center of gravity of the frame and cuts down on deflection of the dash, steering column, etc. as these members are on a shorter radius from the center of gravity.

Other objects and advantages will appear in the course of the following description.

The drawings illustrate the best mode presently contemplated of carrying out the invention.

In the drawings:

Figure 1 is a perspective view of a portion of a vehicle embodying the invention;

Fig. 2 is an enlarged fragmentary side elevation of the side rail of the frame;

Fig. 3 is a fragmentary side elevation of the vehicle with parts broken away and sectioned and showing a modified form of the invention; and Fig. 4 is a section taken along lines 4—4 of Fig. 3.

The drawings illustrate the forward portion of a frame and body structure for a motor vehicle. The frame 1 supports the cowl structure 2 and includes a pair of side rails 3 connected together by a cross bar 4.

Each side rail 3 is formed of a pair of channel shaped members, an inner rail member 5 and an outer rail member 6, which are disposed with the open sides facing each other and are welded together to provide the side rail with a generally box-shaped cross section.

Each side rail 3 is provided with an upwardly offset or kicked-up portion 7 to accommodate the front wheel structure of the vehicle. The cross bar 4 is connected to the side rails in the area of the kicked-up portion 7.

The cowl 2 which is supported by the frame 1 consists of a top section 8, a pair of side sections 9, a forward section or dash 10 and an inclined toe board 11 which extends downwardly from the dash 9 at an angle toward the frame.

According to the invention, the side rails 3 of the frame 1 are increased in vertical dimension or depth in the region beneath the toe board 11 which corresponds generally to the rear slope of the kicked-up portion 7. To this end, the webs of the channel shaped side rail members 5 and 6 are progressively increased in depth, to correspondingly provide the side rails with an increased vertical dimension, starting at a location adjacent the low point of the toe board 11. The upper surfaces of the side rails 3 are inclined upwardly from the low point of the toe board 11 to a position beneath dash 10 at an angle approximately equal to or slightly less than the angle of incline of the toe board.

From a location generally beneath dash 10, the upper surface of each side rail 3 slopes downwardly to a position adjacent the attachment of cross bar 4. This results in the upper surface of the side rail defining a hump 12.

With this construction, the portion of each side rail extending forwardly of cross bar 4 and the portion extending rearwardly of the low point of the toe board have substantially the same depth while the intermediate portion, that extending between the low point of the toe board and cross bar 4, has a substantially greater depth.

To connect the forward portion of the cowl 2 to the frame 1, a bracket 13 is secured to the upper end of toe board 11 at locations above the hump 12 on each side rail 3. The lower end of each bracket 13 is spaced from the peak of the corresponding hump 12 and a resilient or rigid grommet 14 is disposed within the space therebetween.

Brackets 13 are formed with access openings 15 and the brackets are secured to the respective humps by suitable bolts 16.

To fabricate the side rails 3 of the invention, a flat blank having a width indicated by the dashed lines 17 in Fig. 2 is initially kicked up to provide the offset 7. A generally triangular piece 18 of flat stock is then welded edgewise along line 19 to the blank at the kicked-up portion to provide an increased depth for the blank at this portion. The edges of the blank 17 and the triangular piece 18 are then bent at approximately 90° to provide the flanges for the side rail section. The other side rail member is formed in a similar manner and the two members are then disposed with the open ends facing toward each other and are welded together along their length to provide the side rail construction shown in Figure 1.

Figs. 3 and 4 illustrate a modified form of the invention. In this embodiment, the inner members 5a and outer members 6a are formed with substantially the same depth throughout the kicked-up portion 7. To provide an increased depth for the side rail a separate adapter 20 is welded along lines 21 to the upper surface of the side rail at the kicked-up portion. The adapter has a generally triangular shape and is provided with substantially the same width as the side rail 3. The adapter when welded to the side rail 3 provides the side rail with an increased depth similar to that of the first embodiment. The connection of the adapter 20 to the bracket 13 is similar to that of the first embodiment in which a resilient grommet 14 is disposed between the bracket 13 and adapter 20 and a bolt 16 connects the two members.

The present invention provides a frame having increased depth or vertical dimension in the region extending from the low point of the dash to the cross member 4. This increased vertical dimension at the high reaction point provides greater stiffness in this location and increases the resistance of the frame to overall bending and twisting stresses.

Various modes of carrying out the invention are contemplated as being within the scope of the following claims particularly pointing out and distinctly claiming the subject matter which is regarded as the invention.

I claim:

1. In a motor vehicle, a frame including a side rail having a kicked-up portion to accommodate the front wheel structure of the vehicle, a separate body including a dash member connected to the frame and disposed generally rearward of said kicked-up portion, means secured to the side rail on the rearward slope of said kicked-up portion and defining with said side rail a closed section for increasing the vertical dimension of said side rail at said rearward slope, a bracket secured to the dash member and extending toward said means, and means for resiliently connecting said bracket to said first named means to thereby increase the resistance of the frame to twisting and bending stresses.

2. In a motor vehicle, a frame including a side rail having an upwardly offset portion to accommodate the front wheel structure of the vehicle, a separate body including a dash member having a toe board disposed generally rearward of said offset portion and inclined upwardly toward the front of the vehicle, an adapter associated with the upper surface of said side rail at the position of said offset portion and having a generally box shaped cross section with a width substantially equal to the width of said side rail, a bracket secured to the toe board and extending toward said adapter, and means for resiliently connecting the bracket to said adapter to thereby increase the resistance of the frame to twisting and bending stresses.

3. In a motor vehicle, a frame including a side rail having a kicked-up portion to accommodate the front wheel structure of the vehicle, said side rail having a generally box-shaped cross section with the cross section of the portion of the side rail at the rearward slope of the kicked-up portion having a substantially greater vertical dimension than the remainder of the side rail, a separate body including a dash member supported by the frame and disposed generally rearward of said kicked-up portion, a bracket secured to the dash member, and means for resiliently connecting said bracket to the portion of said side rail having the greater vertical dimension to thereby increase the resistance of the frame to twisting and bending stresses.

4. In a motor vehicle, a frame including a pair of side rails extending along the sides of the frame, a separate body including a dash member supported by the frame and including a toe board extending between said side rails, said toe board being inclined upwardly toward the front of the frame from a location substantially adjacent said side rails, means secured to the upper surface of said side rail for increasing the sectional area of said side rails and also the vertical dimension of said side rails in the area beneath the toe board, and means for resiliently connecting said toe board and the last named means to increase the resistance of the frame to twisting and bending stresses.

References Cited in the file of this patent

UNITED STATES PATENTS

| | | |
|---|---|---|
| 1,731,615 | Fekete | Oct. 15, 1929 |
| 1,867,341 | Werdehoff | July 12, 1932 |
| 2,121,497 | Broulhiet | June 21, 1938 |
| 2,384,096 | Kishline | Sept. 4, 1945 |
| 2,662,794 | Lindsay | Dec. 15, 1953 |

FOREIGN PATENTS

| | | |
|---|---|---|
| 495,254 | Great Britain | Nov. 9, 1938 |
| 548,897 | Great Britain | Oct. 28, 1942 |
| 708,825 | Great Britain | May 12, 1954 |

OTHER REFERENCES

"New Austin Eight," in "The Autocar" magazine of Feb. 24, 1939, pages 308–309.

"Ford," article, in "Automobile Engineer," vol. 41, issue 544, of September 1951, pages 327–328.